United States Patent
Zochowski et al.

(10) Patent No.: US 12,092,147 B2
(45) Date of Patent: Sep. 17, 2024

(54) ADJUSTABLE LENGTH ROD-END ASSEMBLY HAVING AN INTEGRAL SECONDARY LOCKING FEATURE

(71) Applicant: Moeller Mfg. Company, LLC, Wixom, MI (US)

(72) Inventors: Eric Zochowski, South Lyon, MI (US); H. Britt Bochiardy, Clearwater, FL (US); Gordon Boggie, Jupiter, FL (US); Bryan Rowe, Holly, MI (US)

(73) Assignee: Moeller Mfg. Company, LLC, Wixom, MI (US)

( * ) Notice: Subject to any disclaimer, the term of this patent is extended or adjusted under 35 U.S.C. 154(b) by 0 days.

(21) Appl. No.: 18/206,242

(22) Filed: Jun. 6, 2023

(65) Prior Publication Data

US 2023/0417271 A1 Dec. 28, 2023

Related U.S. Application Data

(60) Provisional application No. 63/354,417, filed on Jun. 22, 2022.

(51) Int. Cl.
*F16B 39/10* (2006.01)
*F16B 7/06* (2006.01)
*F16C 7/06* (2006.01)

(52) U.S. Cl.
CPC .............. *F16B 39/103* (2013.01); *F16B 7/06* (2013.01); *F16B 39/108* (2013.01); *F16C 7/06* (2013.01)

(58) Field of Classification Search
CPC ........ F16B 7/06; F16B 39/103; F16B 39/108; F16C 7/06
See application file for complete search history.

(56) References Cited

U.S. PATENT DOCUMENTS 4,812,094 A * 3/1989 Grube ................. F16C 25/06
301/124.1
5,618,143 A * 4/1997 Cronin, II ............. F16D 41/061
411/948

(Continued)

FOREIGN PATENT DOCUMENTS

CN 114658742 A * 6/2022
EP 0848189 A2 * 6/1998
FR 3137141 A1 * 12/2023

OTHER PUBLICATIONS

The Use Of Two Nuts To Prevent Self Loosening—Bill Eccles, Bolt Sciense, Fastener + Fixing Magazine, Issue 54, Nov. 2008.

*Primary Examiner* — Adam D Rogers
(74) *Attorney, Agent, or Firm* — Harness, Dickey & Pierce, P.L.C.

(57) ABSTRACT

A precision adjustable length rod end assembly is disclosed and provides a fastener for mechanical assemblies that eliminates the need for a separate secondary locking device. The device includes a connecting rod, an end connector or rod end, and a lock nut assembly. The end connector threadably engages the connecting rod. The lock nut assembly engages both the end connector and the connecting rod. The threaded engagement between the end connector and the connecting rod enables the rod-end assembly to be adjusted to a precise working length (e.g., as measured along the central longitudinal axis). The lock nut assembly maintains the precision-adjusted working length of the rod-end assembly even when the rod-end assembly is exposed to harsh operating conditions, such as exposure to extreme vibrations.

7 Claims, 6 Drawing Sheets

(56) References Cited

U.S. PATENT DOCUMENTS

| | | | |
|---|---|---|---|
| 5,823,702 A | 10/1998 | Bynum | |
| 6,976,816 B2 * | 12/2005 | Slesinski | F16C 25/06 |
| | | | 411/122 |
| 8,506,199 B2 * | 8/2013 | Rump | B62D 17/00 |
| | | | 403/45 |
| 9,593,700 B2 | 3/2017 | Bynum | |
| 9,746,020 B1 * | 8/2017 | Bennett | F16B 39/12 |
| 9,909,446 B2 * | 3/2018 | Bynum | F01D 21/003 |
| 2022/0082121 A1 | 3/2022 | Castaneda et al. | |

* cited by examiner

ADJUSTABLE LENGTH ROD-END ASSEMBLY HAVING AN INTEGRAL SECONDARY LOCKING FEATURE

CROSS-REFERENCE TO RELATED APPLICATIONS

This application claims the benefit of U.S. Provisional Application No. 63/354,417, filed on Jun. 22, 2022. The entire disclosure of the above application is incorporated herein by reference.

FIELD

The present disclosure relates to adjustable rod-ends, turnbuckles and the like for machines, equipment, and mechanical assemblies, particularly of the type requiring secondary locking devices.

BACKGROUND

This section provides background information related to the present disclosure which is not necessarily prior art.

Machines, equipment, mechanical assemblies and mechanisms often include a connector or a fastener that provides a connection or joint that maintains a fixed point of contact between two parts as well as rotational freedom. Rod-ends and turnbuckles are types of such connectors that can fasten or support loads (e.g., compression and tension) and/or connect to and control movement of components (e.g., links and pivot points) of associated assemblies and mechanisms. The rod-ends and turnbuckles commonly provide for a variable length that allows the connection to be adjusted to achieve dimensional precision that is needed for a particular mechanical application. In this respect, rod-ends and turnbuckles can incorporate a threaded connection that allows the relative position of components of the fastener (e.g., a connecting rod and a rod-end) to be adjusted so the overall length of the fastener is varied.

Precision rod-ends and turnbuckles are fasteners known to be used in mechanical assemblies and mechanisms that are subject to harsh operating conditions, such as extreme vibration. It is understood that in many applications it is important to ensure that the threaded connection and relative position between the rod-end and the rod does not loosen or change during normal operation or use of the mechanical assembly. This is particularly the case in aircraft applications, where a precision length adjustment of the fastener may be vital to ensure the proper operation of mechanical assemblies or systems used on aircraft.

A known way to maintain the relative positions of the connecting rod and rod-end and lessen a tendency for the connecting rod and/or rod end to move relative to one another, and thereby impact a precision-adjusted length of the fastener, is by using a locking device, such as a simple lock nut. Further, some applications require a secondary locking device with the fastener. A secondary locking device that is often used in a rod-end is a wire (e.g., lock wire) that is used to secure to the lock nut against the possible loosening of the lock nut. See Prior Art FIG. 1.

Lock wire, also known as safety wire, is often used in situations where mechanical reliability is critical. For example, in aircraft applications, safety wire is used to secure the lock nuts on rod-ends and turnbuckles, as well as with other fasteners in the aircraft. This is because of the significant vibration and other forces that act on the aircraft and its components and mechanisms can contribute to the fasteners inadvertently becoming loose.

In order to service mechanical components and mechanisms, or other systems that include lock-wired fasteners, however, such as for inspection, maintenance, repair, replacement and the like, the lock wire needs to be cut off and disconnected from the fastener before the fastener can be loosened and removed. After the inspection or other work is performed, the fasteners can be reused but they must be re-lock-wired. This process requires specialized skills and training, is labor intensive, and time consuming. Thus, the costs to perform routine maintenance, inspection or other service activities are increased.

Furthermore, in some applications, the maintenance, inspection, repair, replacement or other service activity needed to be performed on apparatus that may be located in a manner such that there is limited space to easily employ or manipulate the tools that are needed to remove the lock wire, unfasten the fasteners and/or re-lock-wire the fasteners after service. These conditions add further difficulties, labor and cost to otherwise routine tasks.

SUMMARY

This section provides a general summary of the disclosure and is not a comprehensive disclosure of its full scope or all of its features.

The disclosure provides an adjustable length rod end assembly. That can be adjusted to a precise working length (e.g., as measured along a central longitudinal axis). The rod end assembly integrates both a primary locking feature and a secondary locking feature that maintains the precision-adjusted working length of the rod-end assembly even when the rod-end assembly is exposed to harsh operating conditions, such as exposure to extreme vibrations.

The rod end assembly includes an end connector extending along a central longitudinal axis and having a first male-threaded shaft. Also included is a connecting rod extending along the central longitudinal axis and comprising a second female-threaded shaft comprising a first head defining a face and a first engagement feature consisting of two opposed parallel planar outer surfaces. The outer surfaces are symmetrical about the central longitudinal axis and separated by a first distance. The first male-threaded shaft of the end connector threadably engages the second female-threaded shaft of the connecting rod to establish an overall length of the rod end assembly.

Also included is a lock nut assembly engaging both the end connector and the connecting rod and configured to fix the precise overall length of the rod end assembly. The lock nut assembly has a combined primary locking feature and a secondary locking feature and consisting of a thrust nut detachably connected to the end connector and a lock ring detachably connected to the connecting rod.

The thrust nut comprises a female-threaded aperture extending through the thrust nut and along the central longitudinal axis, a second head, a detent interface and a tapered leading end located at a longitudinal end of the thrust nut opposite the second head. The female-threaded aperture threadably engages the first male-threaded shaft of the end connector.

The second head of the thrust nut is configured to accommodate a tool for applying a torque to the thrust nut for rotating the thrust nut in a first rotational direction about the central longitudinal axis.

The leading end of the thrust nut abuts or bears with a force against the face of the head of the connecting rod to provide the primary locking feature of the rod end assembly.

The detent interface has an outer cylindrical wall in which are included a plurality of concave-shaped detents that are equally spaced about a circumference of the outer cylindrical wall. The adjacent detents are separated from one another by discrete sections of the outer cylindrical wall.

The lock ring comprises a conically shaped body located intermediate a plurality of resilient beam fingers and a second engagement feature. The plurality of resilient beam fingers are arranged and equally spaced about a circumference of the body and each of the plurality of resilient beam fingers extends in a first direction from the body in a cantilevered manner from a proximal end to a distal end and in a first direction. Each of the plurality of resilient beam fingers extends generally parallel to the central longitudinal axis.

The body further comprises a second engagement feature consisting of two discrete, projections extending from the body in a second direction that is opposite to the first direction. The two projections are symmetrical about the central longitudinal axis. Each projection consists of a planar inner surface and a non-planar outer surface. The two planar inner surfaces are opposed to one another and separated by a second distance that is greater or just slightly greater than the first distance. The first engagement feature of the connecting rod is nested within the second engagement feature of the lock ring so as to be co-operable to prohibit relative rotational movement between the connecting rod and the lock ring about the central longitudinal axis.

In addition, the fingertips of the beam fingers mechanically interact with the detent interface to inhibit rotation of the thrust nut in a second rotational direction about the central longitudinal axis opposite to the first rotational direction to provide the secondary locking feature of the rod end assembly.

In other aspects of the disclosure, the non-planar outer outer surfaces of the two projections are each semi-cylindrical. Alternatively or in addition, the distal ends of the beam fingers each comprise a plurality of beveled surfaces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding references indicate corresponding parts throughout the several views of the drawings.

DESCRIPTION

Example embodiments will now be described more fully with reference to the accompanying drawings.

The adjustable, self-locking rod end assembly 10 of the present disclosure (e.g., FIGS. 2-6) provides a fastener or connector for use in machines, equipment, mechanical assemblies and like apparatus that enables precision adjustability and includes a self-locking feature that eliminates the need for a secondary locking device like lock wire. The adjustable, self-locking rod end assembly 10 extends lengthwise along a central longitudinal axis X.

Figure 1:
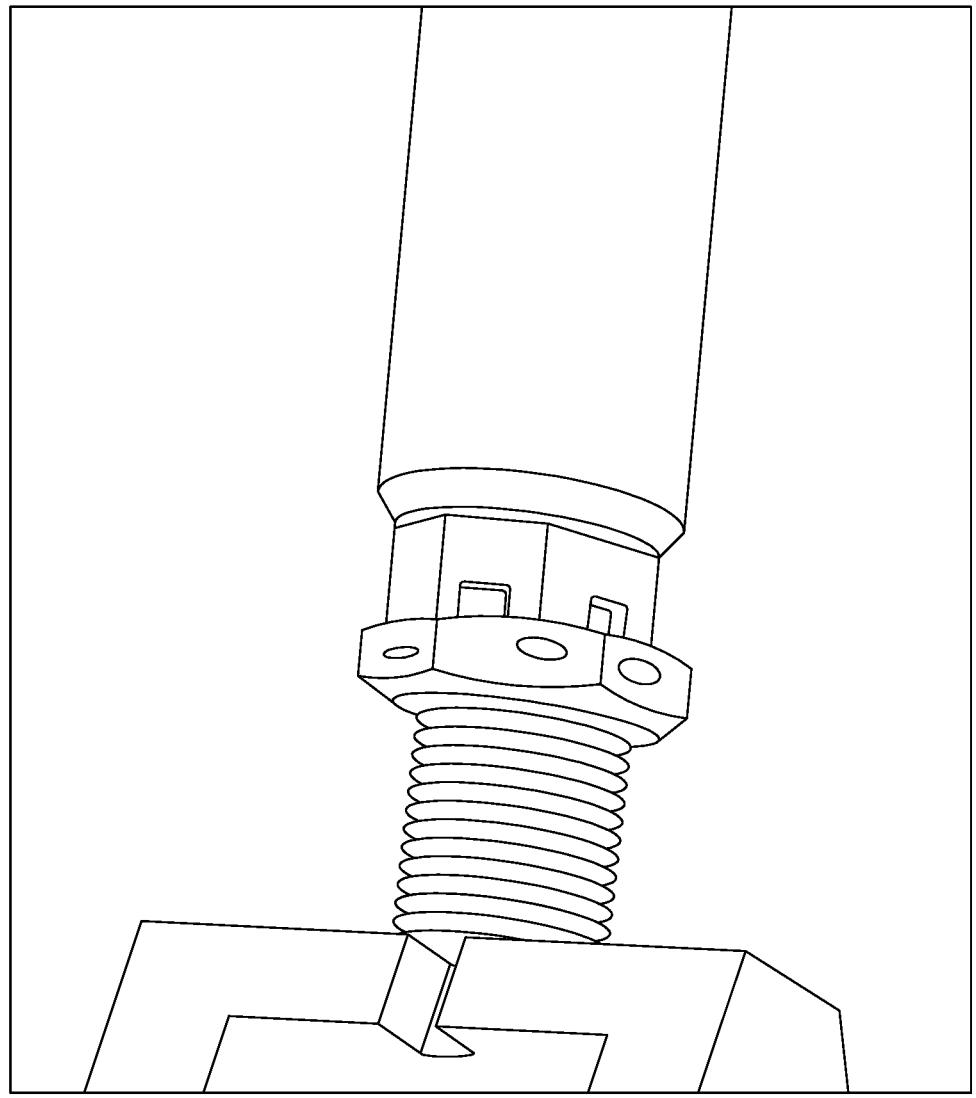
FIG. 1 shows a conventional rod end of the prior art.
Figure 2:
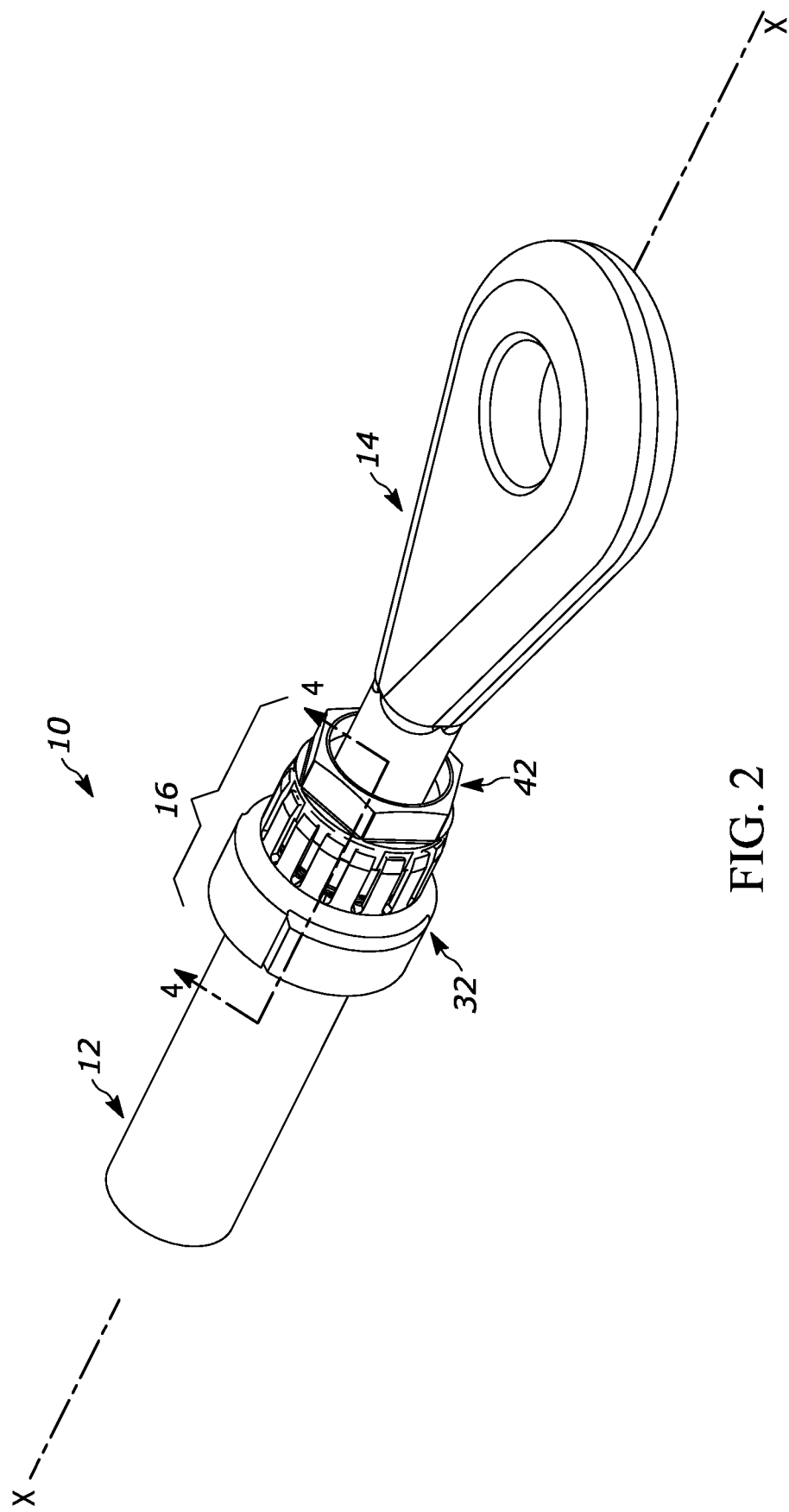
FIG. 2 is a top-front-right isometric view of an adjustable, self-locking rod end according to the principles of the present disclosure.
Figure 3:
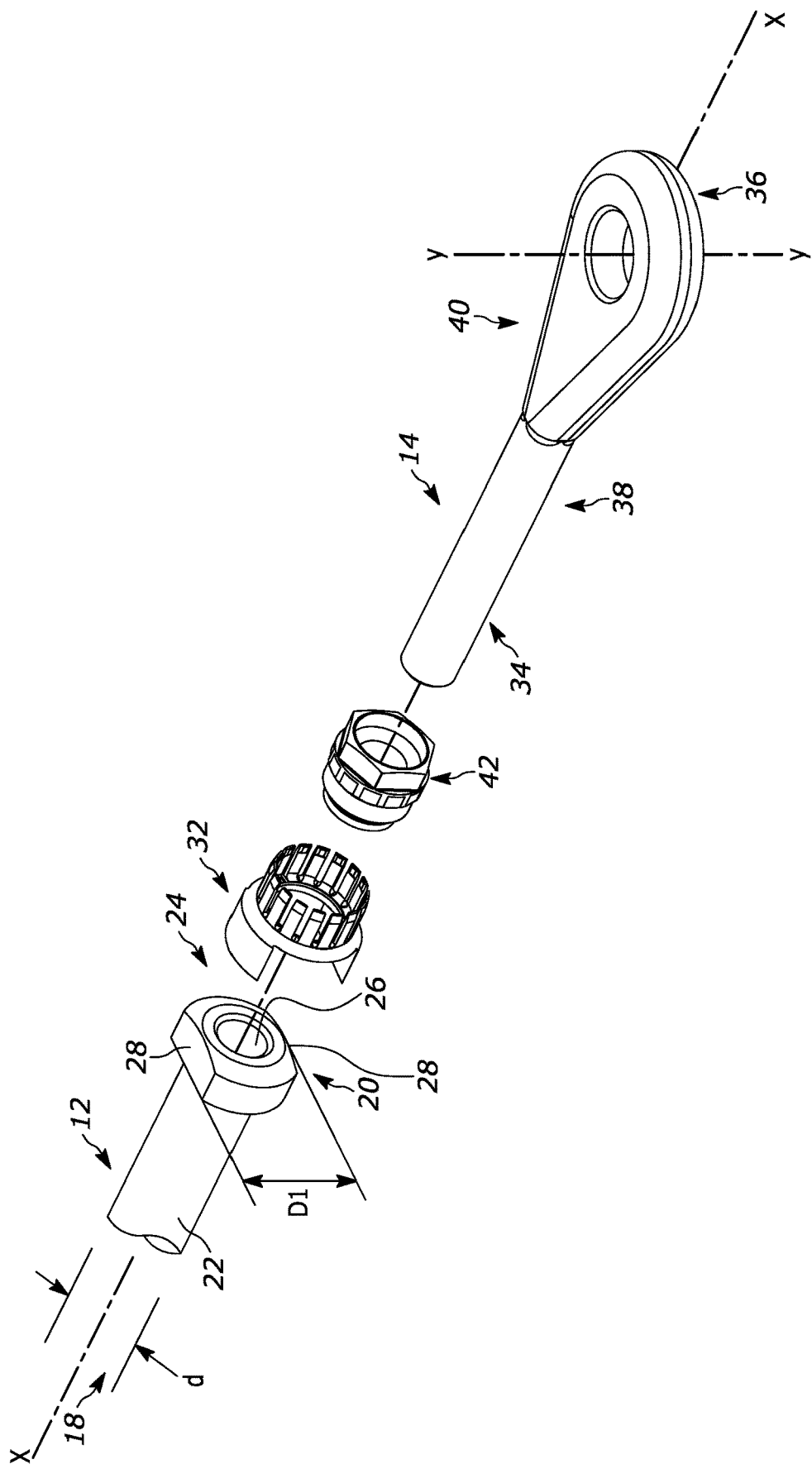
FIG. 3 is an exploded, top-front-right isometric view of the adjustable, self-locking rod end of FIG. 2.

Referring to FIGS. 2 and 3, the adjustable, self-locking rod end assembly 10 of the present disclosure generally includes a connecting rod 12, an end connector or rod end 14, and a lock nut assembly 16. The end connector 14 threadably engages the connecting rod 12. The lock nut assembly 16 engages both the end connector 14 and the connecting rod 12. The rod-end assembly 10 extends for a working length along the central longitudinal axis X. The threaded engagement between the end connector 14 and the connecting rod 12 enables the rod-end assembly 10 to be adjusted to a precise working length (e.g., as measured along the central longitudinal axis X). The lock nut assembly 16 maintains the precision-adjusted working length of the rod-end assembly 10 even when the rod-end assembly 10 is exposed to harsh operating conditions, such as exposure to extreme vibrations.

The connecting rod 12 can be generally understood as similarly configured as any of a number of well-known internally- or externally-threaded connecting rods, turnbuckle connecting rods or hollow, female threaded rods. For example, as shown in FIGS. 2 and 3, the connecting rod 12 can extend along the central longitudinal axis X for a length L1 from a first or proximal end 18 to a second or distal end 20. The length L of the connecting rod can vary. The connecting rod can include a shaft 22 and an engagement portion or head 24. The outer shape or configuration of the shaft 22 can be generally cylindrical or polygonal or another suitable shape. The shape of the shaft 12 can be symmetrical or asymmetrical about the longitudinal axis X. The shaft 22 can have an outer dimension (e.g., a diameter d or height and width, as applicable).

The shaft 22 can be partially or completely hollow and define an inner surface or internal wall 26 at least at the distal end 20. A portion or the entirety of the internal wall 26 can be threaded (e.g., can include female threads). The threads can have a fine or course thread pitch. As can be appreciated, the finer the thread pitch, the greater the precision with which the working length of the rod-end assembly 10 can be adjusted.

Figure 4:
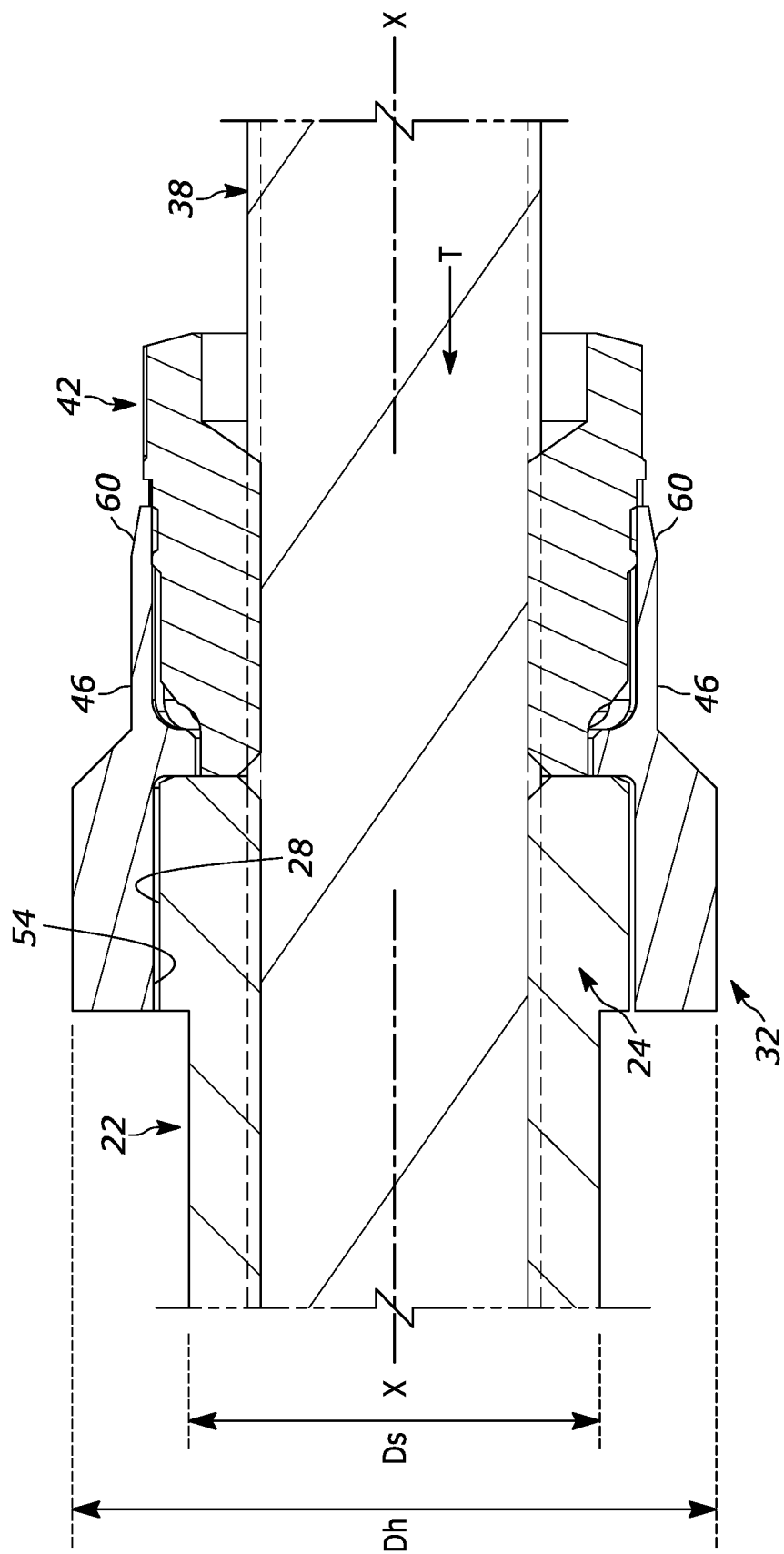
FIG. 4 is an enlarged, cross-sectional detail view along the line 4-4 of FIG. 2.

The engagement portion or head 24 of the connecting rod 12 can be incorporated at the distal end 20 of the shaft 22. The head 24 can be integrally formed with the shaft 22 or otherwise be affixed or secured to the distal end 20 of the shaft 22. The outer shape or configuration of the head can be similarly formed to the shaft 22. The outer shape of the head 24 can further define one or more outer surfaces of the head and, in an end profile, a diameter, a height and width, a circumference and/or a perimeter of the head, as the case may be. The head 24 can extend radially outwardly from the shaft 22 (i.e., generally transverse to the central longitudinal axis X). As seen in FIG. 4, an outer dimension Ds (e.g., a height) of the head can be greater than the outer dimension Ds of the shaft 22. The head 24 can be symmetrical or asymmetrical about the central longitudinal axis X.

The head 24 can include an engagement feature 28 that is co-operable with a mating engagement feature 30 included in lock ring 32, as described further herein. The engagement feature 28 of the head 24a can be incorporated into one or more of the outer surfaces of the head 24 and/or the circumference or perimeter of the head 24. For example, the engagement feature 28 can include one or more planar surfaces or "flats." As shown in FIG. 3, the head 24 can include a pair of planar surfaces disposed at opposite sides of the head 24. The planar surfaces can be opposed to and parallel to one another. The planar surfaces can be separated by a distance (D1).

The end connector or rod end 14 can be generally understood as similarly configured as any of a number of well-known internally- or externally-threaded rod ends. For example, an end connector or rod end 14 is also shown in FIGS. 2 and 3. The end connector 14 can extend along the central longitudinal axis X for a length L2 from a first or proximal end 34 to a second or distal end 36. The length L2 of the end connector can vary. The end connector 14 can include a shaft 38 and connecting portion 40. The shaft 38 can be partially or completely threaded (e.g., to include male threads). The male threads can have a fine or coarse thread pitch. The male threads can correspond to and mate with the female threads of the connecting rod 12. The connecting portion 40 can be integrally formed with the shaft 38 of the end connector 14. The connecting portion 40 can comprise a rod end bolt, a ball joint rod end, a ball joint linkage, a clevis rod end, a swivel shaft rod end, or other known connection feature. As shown in FIGS. 2 and 3, the connecting portion 40 is a rod end bolt having a cylindrical mounting hole extending through the rod end bolt along a centerline Y and near to the distal end 36 of the end connector 14.

With reference to FIGS. 2, 3, 5A, 5B, 6A and 6B, the lock nut assembly 16 for the adjustable, self-locking rod end assembly 10 of the present disclosure can be understood. The lock nut assembly 16 can have a locked condition and an unlocked condition. The lock nut assembly 16 can include a thrust nut 42 and a lock ring 32. The thrust nut 42 can be threaded to the shaft 38 of the end connector 14 near the proximal end 34 of the end connector 14. The lock ring 32 can be disposed between the thrust nut 42 and the connecting rod 12. The lock ring 32 can be rotationally fixed relative to the connecting rod 12 about the central longitudinal axis X, as further described herein. The thrust nut 42 can be rotated about the central longitudinal axis X and tightened to place the lock nut assembly 16 in the locked condition. In the locked condition of the lock assembly 16, the thrust nut 42 can capture the lock ring 32 along the central longitudinal axis X against the connecting rod 12. In the locked condition of the lock nut assembly 16, the lock ring 32 can engage the thrust nut 42 and prevent an unintended loosening rotation of the thrust nut 42.

Figure 6A:
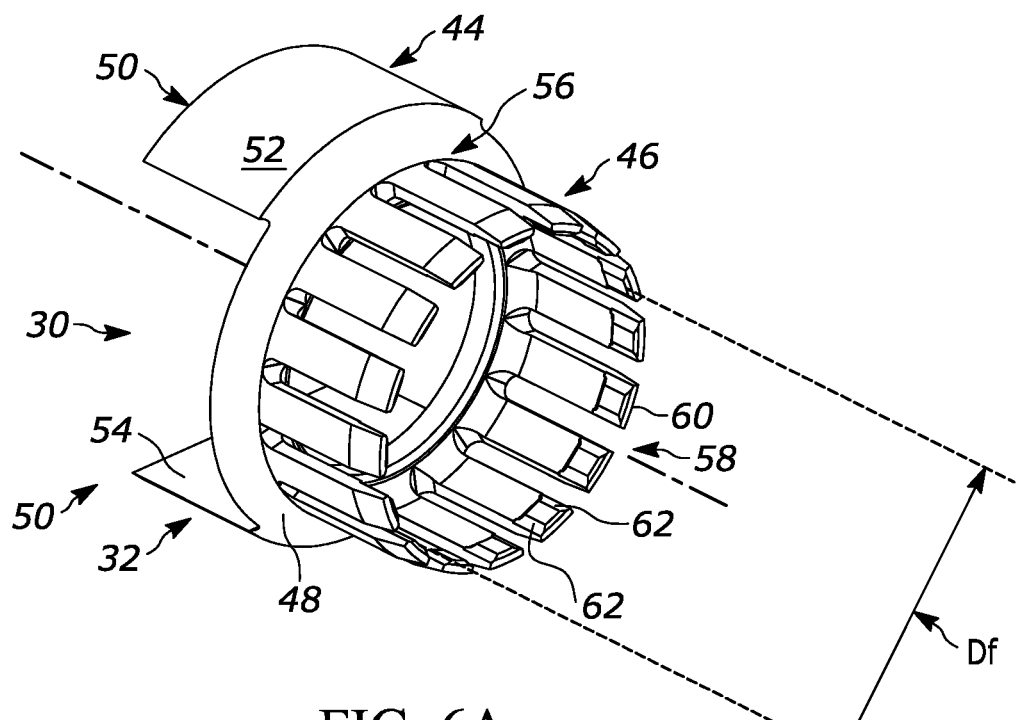
FIG. 6A is a top-front-right isometric view of a thrust nut of the adjustable, self-locking rod end of FIG. 2.
Figure 6B:
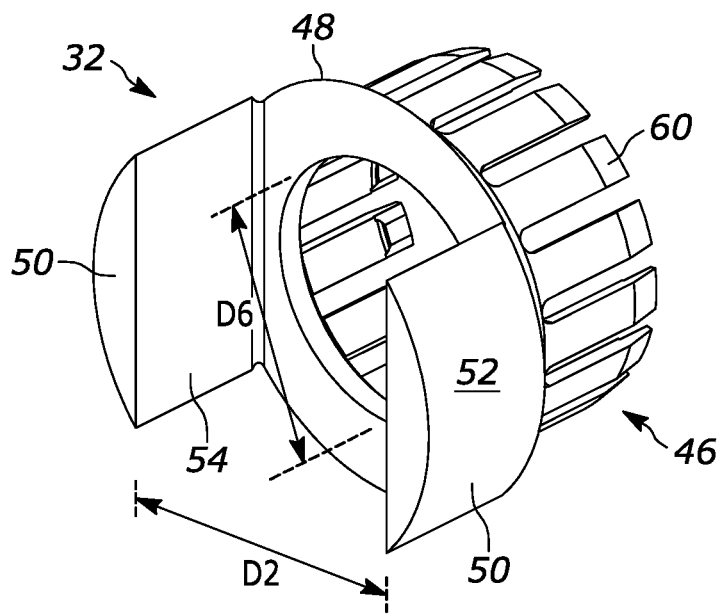
FIG. 6B is a top-left-front isometric view of the thrust nut of FIG. 6A.

As shown in the figures and, particularly FIGS. 6A and 6B, the lock ring 32 includes a body 44 and a plurality of flexible and resilient beam fingers 46. The beam fingers 46 can extend from the body 44 in a first direction. The body 44 can have a generally ring-like, conical portion 48. The beam fingers 46 can be arranged about a circumference of the conical portion 48 of the body 44. It can be appreciated that the number of beam fingers 46 can vary. For example, about 12 to 20 beam fingers can be included.

The body 44 can also include an engagement feature 30. The engagement feature 30 of the body 44 of the lock ring 32 can be co-operable and mate with the engagement feature 28 of the head 24 of the connecting rod 12. As shown in the figures, the engagement feature 30 of the lock ring 32 can include a pair of opposed, spaced apart projections 50 extending from the conical portion 48 in a second direction that is opposite the first direction. The projections 50 can extend generally parallel to the central longitudinal axis X. Each of the projections 50 can include an outer surface 52 and an inner surface 54. For example, as shown the outer surface 52 can be a semi-cylindrical surface and the inner surface 54 can be a planar surface. The inner surfaces 54 can be parallel to one another. The inner surfaces 54 can be spaced apart a distance (D2) that is slightly greater than distance (D1). In this regard, the head 24 of the connecting rod 12 can be disposed between the opposed projections 50 of the lock ring 32. Thereby, the respective engagement features 28, 30 of the connecting rod 12 and the lock ring 32 can be engaged. For example, the planar surfaces of the head 24 can be closely nested within the opposed planar surfaces 54 of the lock ring 32. In this manner, relative rotational movement between the connecting rod 12 and the lock ring 32 is prohibited.

Referring again to FIGS. 6A and 6B, each beam finger 46 of the lock ring 32 extends or projects in the first direction from the ring-like conical portion 48 of the body 44 from a proximal end 56 to a distal end 58. The beam fingers 46 extend in a cantilevered manner. The beam fingers 46 are substantially parallel to the central longitudinal axis X. The distal ends 58 of the beam fingers 46 define fingertips 60. The fingertips 60 of the beam fingers 46 each include a plurality of beveled surfaces 62. In an aspect of the disclosure, the beveled surfaces 62 are located on the inner sides (i.e., inwardly facing toward the central longitudinal axis) of the fingertips 60. The inner sides of the fingertips define a diameter (Df).

The beam fingers 46 are resilient and, due to the cantilevered arrangement, the beam fingers 46 can exhibit limited spring like flexibility or elastic deformation in a direction generally transverse to the central longitudinal axis X (i.e., diametrically inward and outward) when subjected to a force, particularly a normal force at the fingertips 60. As further described herein, the fingertips 60 of the beam fingers 46 are configured to mechanically interact with a detent interface 68 of the thrust nut 42 to inhibit unintended rotation of the thrust nut 42 relative to the lock ring 32 that can lead to a loosening of the lock nut assembly 16.

Figure 5A:
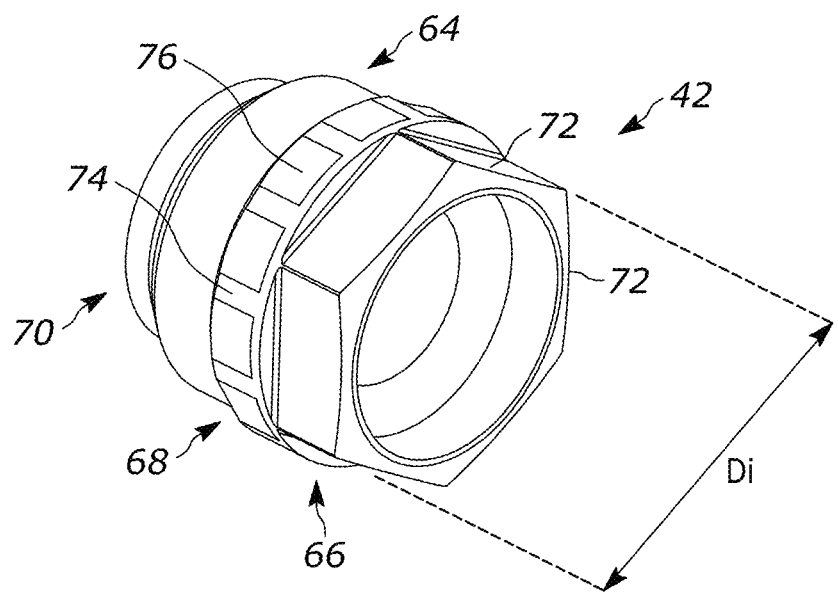
FIG. 5A is a top-front-right isometric view of a lock ring of the adjustable, self-locking rod end of FIG. 2.
Figure 5B:
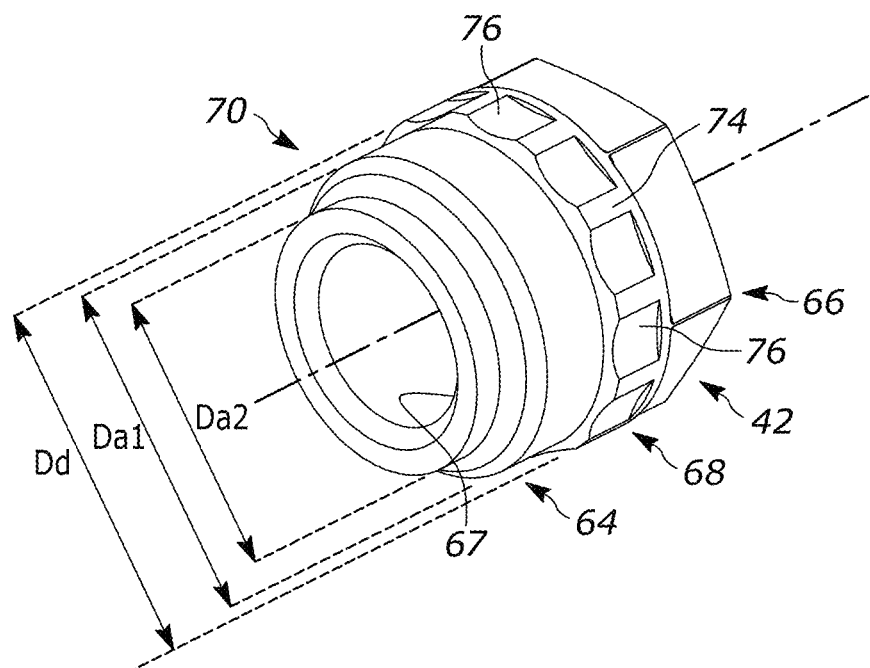
FIG. 5B is a top-left-front isometric view of the lock ring of FIG. 5A.

The thrust nut 42 of the lock nut assembly 16 is best seen in FIGS. 5A and 5B. For example, the thrust nut 42 can be a threaded fastener. The thrust nut 42 can have a hollow, generally cylindrically-shaped body 64 extending along the central longitudinal axis X. The hollow interior of the thrust nut body 64 can define an inner surface or internal wall 67 extending through the body 64. A portion or the entirety of the internal wall 66 can be threaded, e.g., to include female threads. The threads can have a fine or course thread pitch. The female threads can correspond to and mate with the male threads of the shaft 38 of the end connector 14. The thrust nut 42 can be threaded to the shaft 38 of the end connector 14.

The outer side of the body 64 can be described as defining a head 66, a detent interface 68, and a leading end or abutment portion 70. The head 66 of the outer side of the body 64 is configured to accommodate a tool for applying a torque to the thrust nut 42 and for rotating the thrust nut 42 about the central longitudinal axis X when the female threads on the internal wall 67 of the thrust nut 42 engage the male threads on the shaft 38 of the end connector 14. For example, the head 66 can include one or more tool-engaging surfaces 72 or "flats." In particular, as shown in FIG. 5, the head 66 can be polygonal-shaped (e.g. hexagonal) and have a plurality (e.g., 6) of exterior surfaces that a wrench or similar tool can engage to act on the thrust nut 42.

Referring again to FIGS. 5A and 5B, the detent interface 68 can be formed or located on the outer side of the body 64 between the head 66 and the abutment portion 70. Referring more specifically to the detent interface 68, a portion of the outer side of the body 64 can define a generally cylindrical outer circumferential wall 74 having a diameter (Di). The diameter (Di) of the outer circumferential wall 74 can be greater than the diameter (Df) defined by the inner sides of the fingertips 60.

Included about the circumference of the generally cylindrical outer circumferential wall 74 are a plurality of equally-spaced, concave-shaped depressions or detents 76. The depths of detents define a diameter (Dd) that can be substantially the same as the diameter (Df) defined by the inner sides of the fingertips 60. Adjacent detents 76 can be separated from one another by discrete sections of the outer circumferential wall 74. It can be appreciated that the number of detents 76 can vary. For example, about 12 to 20 detents 76 can be included about the outer circumferential wall 74. The number of detents 76 can be the same as the number of beam fingers 46.

Further, it is contemplated that the detent interface 68 can be integrally formed with the outer side of the body 64 of the thrust nut 42. Alternatively, the detent interface 68 can be provided by way of a separate component (e.g., a detent ring) that can be assembled with and/or secured to the outer side of the body 64 of the thrust nut 42. In this respect, the separate detent ring can include the outer circumferential and cylindrical wall 74 comprising the plurality of detents 76. Additionally, the separate detent ring can have an inner side that can be attached to the outer side of the body of the thrust nut. The detent ring can be secured to the thrust nut 42, e.g., by a press fit, screw threads, welding, or otherwise.

The abutment portion 70 of the thrust nut 42 can provide a tapered leading end to the thrust nut 42. The abutment portion 70 can have a first outer diameter (Da1) that is smaller than the diameter (Df) defined by the inner sides of the fingertips 60 and a second outer diameter (Da2) that is smaller than an inner diameter of (Db) of the conical portion 48 of the body 44 of the lock ring 32. When the locknut assembly 16 is in the locked condition, the abutment portion 70 of the thrust nut 42 can be nested within the lock ring 32 and butt against the head 24 of the connecting rod 12. The thrust nut 42 can capture the lock ring 32 against the connecting rod 12. See, e.g., FIG. 4.

Turning now to FIG. 4, an enlarged, cross-sectional detail view of the adjustable, self-locking rod end assembly 10 of the present disclosure along the line 4-4 of FIG. 2 is illustrated. The rod end assembly 10 is in shown in an assembled and locked condition (i.e., the lock nut assembly 16 is engaged). In the locked condition, the detent interface 68 can be co-operable with the lock ring 32 to inhibit unintended rotation of the thrust nut 42 relative to the lock ring 32.

As shown in FIG. 4, the rod end 14 is threaded to the connecting rod 12 to achieve the precise working length (L) of the rod end 10 assembly. The lock ring 32 is engaged with the connecting rod 12 and the thrust nut 42 is threaded to the rod end 14. In the locked condition, the thrust nut 42 is rotated in a tightening manner and moved along the shaft 38 of the rod end 14 toward the connecting rod 12 (e.g., in the direction of arrow (T)). As the thrust nut 42 moves in the direction of arrow (T), the beam fingers 46 of the lock ring 32 can engage the detent interface 68 of the thrust nut 42.

As previously described, the cantilevered beam fingers 46 are resiliently flexible and the inner sides of the fingertips 60 define a diameter (Df). As the thrust nut 42 is rotated, the fingertips 60 of the beam fingers 46 can alternatively engage the detents 76 (as seen in FIG. 4) and the outer circumferential wall 74 of the detent interface 68 in a "snap-acting" manner. That is, when the fingertips 60 engage the outer circumferential wall 74 of the detent interface 68, the resilient beam fingers 46 are biased outwardly, normal from the central longitudinal axis X. As such, the beam fingers 46 apply a normal force against the detent interface 68 of the lock ring 32, and produce a tangential friction force against the thrust nut 42. The beveled surfaces 62 of the fingertips 60 aid in the smooth engagement between the beam fingers 46 and detent interface 68. When continued rotation of the thrust nut 42 causes the beam fingers 46 to engage the detents 76, the bias against the beam fingers 46 is removed and the beam fingers 46 "snap" into engagement with the detents 76. Consequently, the lock ring 32 produces a resistance to rotating of the thrust nut 42 that must be overcome during both tightening and loosening of the thrust nut 42. As can be appreciated, tightening of the thrust nut 42 can be easily accomplished with a tool, and loosening without a tool is substantially prevented.

The adjustable, self-locking rod end assembly 10 of the present disclosure and its various components can be manufactured or formed from any of a variety of materials well-known in the art, such as metals and plastics. Additionally, the adjustable, self-locking rod end assembly 10 can take the form of a one-ended, adjustable-length fastener or a two-ended, adjustable-length fastener (e.g., a turnbuckle). Still further, at least some of the threaded connections described may be reversed (e.g., internal threads may be external threads and vice versa).

The adjustable, self-locking rod end assembly 10 of the present disclosure eliminates the need for a secondary locking device like lock wire. With the adjustable, self-locking rod end assembly 10 of the present disclosure, therefore, the need to cut and remove any lock wire affixed to the rod end 14 to conduct maintenance, inspection, repair, replacement or other service activities on the rod end, itself, or the machines, equipment, or mechanical assemblies with which the rod end is associated, and then to reattach the lock wire when the task is complete, is eliminated.

Further areas of applicability will become apparent from the description provided herein. The description and specific examples in this summary are intended for purposes of illustration only and are not intended to limit the scope of the present disclosure.

What is claimed is:

1. An adjustable length rod end assembly comprising:
    an end connector extending along a central longitudinal axis and comprising a first male-threaded shaft;
    a connecting rod extending along the central longitudinal axis and comprising a second female-threaded shaft comprising a first head defining a face and a first engagement feature consisting of two opposed parallel planar outer surfaces, wherein the outer surfaces are symmetrical about the central longitudinal axis and separated by a first distance (D1);
    wherein the first male-threaded shaft of the end connector threadably engages the second female-threaded shaft of the connecting rod to define a precise overall length of the adjustable length rod end assembly along the central longitudinal axis;

a lock nut assembly engaging both the end connector and the connecting rod and configured to fix the overall length of the adjustable length rod end assembly along the central longitudinal axis, the lock nut assembly comprising a combined primary locking feature and a secondary locking feature and consisting of a thrust nut detachably connected to the end connector and a lock ring detachably connected to the connecting rod;

wherein the thrust nut comprises a female-threaded aperture extending through the thrust nut and along the central longitudinal axis, a second head, a detent interface and a tapered leading end located at a longitudinal end of the thrust nut opposite the second head;

wherein the female-threaded aperture threadably engages the first male-threaded shaft of the end connector;

wherein the second head of the thrust nut is configured to accommodate a tool for applying a torque to the thrust nut for rotating the thrust nut in a first rotational direction about the central longitudinal axis;

wherein the leading end of the thrust nut comprises an abutment portion that, in an assembled state of the adjustable length rod end assembly, bears with a force against the face of the first head of the connecting rod to provide the primary locking feature of the adjustable length rod end assembly;

wherein the detent interface comprises an outer cylindrical wall in which are included a plurality of concave-shaped detents that are equally spaced about a circumference of the outer cylindrical wall, wherein adjacent detents are separated from one another by discrete sections of the outer cylindrical wall;

wherein the lock ring comprises a conically shaped body located intermediate a plurality of resilient beam fingers and a second engagement feature;

wherein the plurality of resilient beam fingers are arranged and equally spaced about a circumference of the body, wherein each of the plurality of resilient beam fingers extends in a first direction from the body in a cantilevered manner from a proximal end to a distal end, wherein each of the plurality of resilient beam fingers extends generally parallel to the central longitudinal axis;

wherein the body further comprises a second engagement feature consisting of two discrete projections extending from the body in a second direction that is opposite to the first direction, wherein the two projections are symmetrical about the central longitudinal axis, wherein each projection consists of a planar inner surface and a semi-cylindrical outer surface, wherein the two planar inner surfaces are opposed to one another and separated by a second distance (D2) that is greater than the first distance (D1);

wherein the first engagement feature of the connecting rod is nested within the second engagement feature of the lock ring so that in the assembled state of the adjustable length rod end assembly the first engagement feature of the connecting rod and the second engagement feature of the lock ring are co-operable to prohibit relative rotational movement about the central longitudinal axis between the connecting rod and the lock ring; and wherein the distal ends of the beam fingers mechanically interact with the detent interface to inhibit rotation of the thrust nut in a second rotational direction about the central longitudinal axis that is opposite to the first rotational direction about the central longitudinal axis to provide the secondary locking feature of the adjustable length rod end assembly.

2. The rod end assembly of claim 1, wherein the distal ends of the beam fingers each comprise a plurality of beveled surfaces.

3. An adjustable length rod end assembly comprising:

a connecting rod extending along a central longitudinal axis and comprising a first female-threaded shaft having a first head defining a face and a first engagement feature consisting of two opposed parallel planar outer surfaces, wherein the outer surfaces are symmetrical about the central longitudinal axis and separated by a first distance (D1);

an end connector extending along the central longitudinal axis and comprising a second male-threaded shaft, the second male-threaded shaft of the end connector threadably engaging the first female-threaded shaft of the connecting rod to define a precise overall length of the rod end assembly; and a lock nut assembly engaging both the connecting rod and the end connector, the lock nut assembly consisting of a lock ring that detachably connects to the first head of the connecting rod and a thrust nut that threadably engages the end connector;

wherein the lock ring comprises a body located intermediate a plurality of resilient beam fingers and a second engagement feature;

wherein the plurality of resilient beam fingers are arranged generally parallel to the central longitudinal axis and equidistant about a circumference of the body, wherein each beam finger extends in a first direction from the body in a cantilevered manner from a proximal end to a distal end;

wherein the second engagement feature consists of a pair of projections extending from the body in a second direction that is opposite to the first direction, the second engagement feature being co-operable with the first engagement feature of the first head of the connecting rod to prohibit relative rotational movement between the lock ring and the connecting rod about the central longitudinal axis;

wherein the thrust nut comprises an aperture extending along the central longitudinal axis, a second head, a detent interface and a tapered leading end;

wherein the aperture is at least partially threaded and threadably engages the second male-threaded shaft of the end connector;

wherein the second head of the thrust nut is configured to accommodate a tool for applying a torque to the thrust nut for rotating the thrust nut in a first rotational direction about the central longitudinal axis;

wherein the detent interface comprises an outer circumferential wall in which are included a plurality of spaced-apart, concave-shaped detents that are equally spaced about a perimeter of the outer circumferential wall, wherein adjacent detents are separated from one another by discrete sections of the outer circumferential wall;

wherein the leading end of the thrust nut bears directly against the face of the first head of the connecting rod; and wherein the distal ends of the beam fingers mechanically interact with the detent interface to inhibit rotation of the thrust nut in a second rotational direction about the central longitudinal axis opposite the first rotational direction.

4. The rod end assembly of claim 3:
wherein the projections extend generally parallel to the central longitudinal axis;
wherein each of the projections includes an outer surface and an inner surface;
wherein the outer surface is semi-cylindrical; and
wherein the inner surface is planar.

5. The rod end assembly of claim 4:
Wherein the inner surfaces are spaced apart a second distance (D2), wherein the second distance (D2) is greater than the first distance (D1).

6. The rod end assembly of claim 5:
wherein the first engagement feature of the connecting rod is nestingly received in the second engagement feature of the lock ring.

7. The rod end assembly of claim 6:
wherein the distal end of each beam finger comprises a beveled surface that mechanically interacts with the detent interface.

* * * * *